United States Patent
Reddy et al.

(10) Patent No.: US 6,214,949 B1
(45) Date of Patent: Apr. 10, 2001

(54) POLYMERIZATION OF POLYOLEFINS HAVING LOW MELT FLOW AND HIGH MOLECULAR WEIGHT

(75) Inventors: B. Raghava Reddy, Baytown; Edwar S. Shamshoum, Houston, both of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 08/174,997

(22) Filed: Dec. 29, 1993

(51) Int. Cl.$^7$ ........................................... C08F 4/64
(52) U.S. Cl. .................. 526/114; 526/113; 526/118; 526/119; 526/128; 526/160
(58) Field of Search .................... 526/113, 114, 526/118, 119, 128, 160

(56) References Cited

U.S. PATENT DOCUMENTS

| | | | |
|---|---|---|---|
| 4,900,706 | * 2/1990 | Sasaki et al. | 502/116 |
| 5,104,838 | * 4/1992 | Fujita et al. | 502/108 |
| 5,145,818 | * 9/1992 | Tsutsui et al. | 502/113 |
| 5,244,989 | * 9/1993 | Hara et al. | 526/119 |

* cited by examiner

*Primary Examiner*—David W. Wu
(74) *Attorney, Agent, or Firm*—Jim D. Wheelington

(57) ABSTRACT

A catalyst system which combines a unbridged metallocene catalyst and a heterogeneous catalyst affects the molecular weight, the molecular weight distribution and the melt flow index of the resulting polymer. To obtain a polymer having high molecular weight and fractional melt flow index, the unbridged metallocene compound is preferably cyclopentadienyltitanium trichloride or bis(cyclopentadienyl)titanium dichloride and an alumoxane co-catalyst may or may not be present. To obtain a polymer having high molecular weight, broad molecular weight distribution and fractional melt flow index, the unbridged metallocene compound is preferably cyclopentadienyltitanium trichloride or bis(cyclopentadienyl)titanium dichloride and an alumoxane co-catalyst is present.

A catalyst system which combines a unbridged metallocene catalyst and a bridged metallocene catalyst with the heterogeneous catalyst affects the xylene solubles in addition to the other polymer properties. To obtain a polymer having high molecular weight, broad molecular weight distribution, fractional melt flow index and low xylene solubles, the unbridged metallocene compound is preferably bis(cyclopentadienyl)titanium dichloride, the bridged metallocene compound is preferably ethylenebis(indenyl)zirconium dichloride and an alumoxane co-catalyst is present.

46 Claims, No Drawings

POLYMERIZATION OF POLYOLEFINS HAVING LOW MELT FLOW AND HIGH MOLECULAR WEIGHT

BACKGROUND OF THE INVENTION

1. Field of the Invention

This invention relates to a catalyst system which is a combination of at least one unbridged metallocene catalyst and at least one heterogeneous catalyst. Combining at least one unbridged metallocene catalyst with the heterogeneous catalyst affects the molecular weight ($M_w$), the molecular weight distribution (MWD or $M_w/M_n$) and the melt flow index of the resulting polymer. Combining at least one unbridged metallocene catalyst and at least one bridged metallocene catalyst with the heterogeneous catalyst affects the xylene solubles in addition to the molecular weight, the molecular weight distribution and melt flow index of the resulting polymer.

2. Description of the Prior Art

It is known that two or more homogeneous catalysts, such as those based on metallocene compounds, may be combined to effect properties, such as molecular weight distribution. U.S. Pat. No. 4,530,914 discloses use of a catalyst system comprising two or more metallocenes in the polymerization of a-olefins, primarily ethylene, to obtain a broad molecular weight distribution. The metallocenes each have different propagation and termination rate constants. The metallocenes are mixed with an alumoxane to form the catalyst system.

It is also known that metallocenes may be affixed to a support to simulate a heterogeneous catalyst. U.S. Pat. No. 4,808,561 discloses reacting a metallocene with an alumoxane and forming a reaction product in the presence of a support. The support is a porous material like talc, inorganic oxides such as Group IIA, IIIA IVA or IVB metal oxides like silica, alumina, silica-alumina, magnesia, titania, zirconia and mixtures thereof, and resinous material such as polyolefins, e.g., finely divided polyethylene. The metallocenes and alumoxanes are deposited on the dehydrated support material.

In U.S. Pat. No. 4,701,432 a support is treated with at least one metallocene and at least one non-metallocene transition metal compound. To form a catalyst system a cocatalyst comprising an alumoxane and an organometallic compound of Group IA, IIA, IIB and IIIA is added to the supported metallocene/non-metallocene. The support is a porous solid such as talc or inorganic oxides or resinous materials, preferably an inorganic oxide, such as silica, alumina, silica-alumina, magnesia, titania or zirconia, in finely divided form. By depositing the soluble metallocene on the support material it is converted to a heterogeneous supported catalyst. The transition metal compound, such as $TiCl_4$, is contacted with the support material prior to, after, simultaneously with or separately from contacting the metallocene with the support.

It is known that $Cp_2TiCl_2$ in the presence of alkylaluminum compounds polymerizes ethylene but not propylene whereas in the presence of methylalumoxane (MAO) $Cp_2TiCl_2$ polymerizes propylene also to produce atactic polypropylene. Combination of dimethyl titanocene and its Cp-substituted analogues and $TiCl_3$ for propylene polymerizations has been reported in U.S. Pat. No. 2,992,212 and in "Thermoplastic Elastomers Based on Block Copolymers of Ethylene and Propylene", G. A. Lock, *Advances in Polyolefins*, p. 59–74, Raymond B. Seymour, Ed. MAO was not used in this polymerization.

It would be advantageous to change polymer properties in a polymerization processes using a conventional supported Ziegler-Natta catalyst by the combination with at least one metallocene catalyst which may interact or modify the Ziegler-Natta catalyst in addition to producing polymer.

SUMMARY OF THE INVENTION

Accordingly, an object of this invention is to change polymer properties in polymerization processes using a conventional supported Ziegler-Natta catalyst and at least one unbridged metallocene catalyst.

And, an object of this invention is to change polymer properties in polymerization processes using a conventional supported Ziegler-Natta catalyst, one unbridged metallocene catalyst and one bridged metallocene catalyst.

Also, an object of this invention is to produce a polyolefin having high molecular weight and broad molecular weight distribution.

Further, an object of this invention is to produce a polyolefin having high molecular weight, broad molecular weight distribution and fractional melt flow index.

Moreover, an object of this invention is to produce a polyolefin having high molecular weight, broad molecular weight distribution, fractional melt flow index and low xylene solubles.

These and other objects are accomplished by a catalyst system comprising at least one metallocene catalyst and at least one heterogeneous catalyst, i.e, cyclopentadienide compound and conventional Ziegler-Natta catalyst, respectively, with an alkylaluminum co-catalyst, an alumoxane co-catalyst (for some purposes) and an organosilicon selectivity control agent.

The catalyst system may be used in a process for the polymerization of propylene comprising:

a) selecting a conventional Ziegler-Natta catalyst component;

b) contacting the catalyst with a metallocene compound of

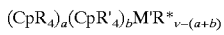

where Cp is a cyclopentadienyl ring, a and b are 0 or 1, indicating whether the particular Cp ring is present, but at least one of a or b must be 1; M' is titanium or zirconium and if M' is zirconium a is 1 and b is 0, R* is a hydride, a halogen or a hydrocarbyl from 1–20 carbon atoms, v is the valence of M';

c) contacting an electron donor containing silicon with an organoaluminum co-catalyst compound; wherein said external electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different and wherein said aluminum trialkyl co-catalyst is described by the formula $AlR'_3$ where R' is an alkyl of from 1–8 carbon atoms and R' may be the same or different;

d) adding the catalyst to the electron donor/co-catalyst mixture to form a catalyst system;

e) introducing the catalyst system into a polymerization reaction zone containing a monomer under polymerization reaction conditions; and f) extracting polypropylene from the reactor having a molecular weight of at least 300,000 and a melt flow index of less than or equal to 1.

The catalyst system may also be used in a process for the polymerization of propylene comprising:

a) selecting a conventional Ziegler-Natta catalyst component;

b) contacting the catalyst with a metallocene compound of

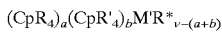
$$(CpR_4)_a(CpR'_4)_b M'R^*_{v-(a+b)}$$

where Cp is a cyclopentadienyl ring, a and b are 0 or 1, indicating whether the particular Cp ring is present, but at least one of a or b must be 1; M' is titanium, R* is a hydride, a halogen or a hydrocarbyl from 1–20 carbon atoms, v is the valence of M';

c) contacting an electron donor containing silicon with an organoaluminum co-catalyst compound; wherein said external electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different and wherein said aluminum trialkyl co-catalyst is described by the formula $AlR'_3$ where R' is an alkyl of from 1–8 carbon atoms and R' may be the same or different;

d) adding an alumoxane of the general formula (R—Al—O—)$_n$ in the cyclic form and R(R—Al—O)—$_n$—AlR$_2$ in the linear form wherein R is an alkyl group with one to five carbon atoms and n is an integer from 1 to about 20;

e) adding the catalyst to the electron donor/co-catalyst mixture to form a catalyst system;

f) introducing the catalyst system into a polymerization reaction zone containing a monomer under polymerization reaction conditions; and g) extracting polypropylene from the reactor having a molecular weight of at least 300,000, a molecular weight distribution of at least 7.0 and a melt flow index of less than 1.

Additionally, the catalyst system may be used in a process for the polymerization of propylene comprising:

a) selecting a conventional supported Ziegler-Natta catalyst component;

b) contacting the catalyst component with at least one metallocene compound of the formula:

$$R''(CpR_4)(CpR'_4)M''R^*_{v-2}$$

where Cp is a cyclopentadienyl ring, R and R' are substituents on the cyclopentadienyl rings such that (CpR$_4$) and (CpR'$_4$) are both indenyl; R'' is a structural bridge between the two Cp rings imparting stereorigidity to the Cp rings; M'' is titanium, R* is a hydride, a halogen or a hydrocarbyl from 1–20 carbon atoms, v is the valence of M'';

and with at least one metallocene compound of the general formula:

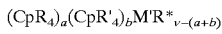
$$(CpR_4)_a(CpR'_4)_b M'R^*_{v-(a+b)}$$

where Cp is a cyclopentadienyl ring, a and b are 0 or 1, indicating whether the particular Cp ring is present, but at least one of a or b must be 1; M' is titanium or zirconium, R is a hydride, a halogen or a hydrocarbyl from 1–20 carbon atoms, v is the valence of M';

c) contacting an electron donor containing silicon with an organoaluminum co-catalyst compound; wherein said external electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different and wherein said aluminum trialkyl co-catalyst is described by the formula $AlR'_3$ where R' is an alkyl of from 1–8 carbon atoms and R' may be the same or different;

d) adding an alumoxane of the general formula (R—Al—O—)$_n$ in the cyclic form and R(R—Al—O)—$_n$—AlR in the linear form wherein R is an alkyl group with one to five carbon atoms and n is an integer from 1 to about 20;

e) adding the catalyst to the electron donor/co-catalyst mixture to form a catalyst system;

f) introducing the catalyst system into a polymerization reaction zone containing a monomer under polymerization reaction conditions; and g) extracting polypropylene from the reactor having a molecular weight of at least 300,000, a molecular weight distribution of 7.0, a melt flow index less than 1 and xylene solubles less than 6%.

DETAILED DESCRIPTION OF THE INVENTION

The present invention provides for a catalyst for polymerization of olefins comprising:

a) a conventional supported Ziegler-Natta transition metal catalyst component;

b) an unbridged metallocene compound;

c) an aluminum trialkyl co-catalyst; and d) an external electron donor.

Depending on the results desired, the catalyst may also include a bridged metallocene compound and an alumoxane co-catalyst.

The present invention also provides a process for making a catalyst for polymerization of olefins comprising:

a) selecting a conventional supported transition metal Ziegler-Natta catalyst component;

b) contacting the catalyst component with an unbridged metallocene compound;

c) adding an aluminum trialkyl co-catalyst; and d) adding an external electron donor either simultaneously with or after step (c), Depending on the results desired, the process may also include contacting the catalyst component with a bridged metallocene compound in addition to the unbridged metallocene compound and adding an alumoxane.

The present invention also provides a process for the polymerization of olefins using the catalyst system described above comprising:

a) selecting a conventional Ziegler-Natta transition metal catalyst component;

b) contacting the catalyst with an unbridged metallocene compound;

c) contacting an electron donor containing silicon with an organoaluminum co-catalyst compound;

d) adding an alumoxane;

e) adding the catalyst to the electron donor/co-catalyst mixture to form a catalyst system;

f) introducing the catalyst system into a polymerization reaction zone containing a monomer under polymerization reaction conditions; and g) extracting polymer product from the reactor.

The polymer product extracted from the reactor has a high molecular weight, a high molecular weight distribution and a fractional melt flow. If the olefin used in the polymerization process is propylene, the molecular weight is above 300,000, preferably in the range from 350,000 to 800,000, the molecular weight distribution is above 7.0, preferably in the range from 10.0 to 14.0 and the melt flow index is below 1, preferably in the range from 0.1 to 0.5.

A Ziegler-Natta catalyst may be pre-polymerized to improve the performance of the catalyst. Generally, a pre-polymerization process is effected by contacting a small amount of monomer with the catalyst after the catalyst has been contacted with the electron donor. A pre-polymerization process is described in U.S. Pat. Nos. 4,767,735, 4,927,797 and 5,122,583, hereby incorporated by reference.

The polymer product produced by using a bridged metallocene compound as described above can have low xylene solubles in addition to a high molecular weight, a high molecular weight distribution and a fractional melt flow index. If the olefin used in the polymerization process is propylene, the xylene solubles will be below 6.0% and preferably in the range from about 2% to about 5.5%.

The present invention relates to the combination of a two particular types of catalysts for use in the polymerization of polyolefins. This combination results in a catalyst system that produces a polyolefin with increased molecular weight, broader molecular weight distribution and fractional melt flow index as illustrated by the comparative examples included below. The catalyst system also provides low xylene solubles of the polymer product. These and other beneficial advantages will become more apparent from the following detailed description of the invention and the accompanying examples.

Any of the conventional supported Ziegler-Natta transition metal compound catalyst components can be used in the present invention. The transition metal compound is preferably of the general formula $MR^+_x$ where M is the metal, $R^+$ is a halogen or a hydrocarbyloxy and x is the valence of the metal. Preferably, M is a Group IVB metal, more preferably a Group IVB, and most preferably titanium. Preferably, $R^+$ is chlorine, bromine, an alkoxy or a phenoxy, more preferably chlorine or ethoxy and most preferably, chlorine. Illustrative examples of the transition metal compounds are $TiCl_4$, $TiBr_4$, $Ti(OC_2H_5)_3Cl$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The support should be an inert solid which is chemically unreactive with any of the components of the conventional Ziegler-Natta Catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

One particular Ziegler-Natta catalyst which can be used in the present invention is a Ziegler-type titanium catalyst for the polymerization of olefins as disclosed in U.S. Pat. Nos. 4,927,797; 4,816,433 and 4,839,321, the disclosures of which are hereby incorporated. The catalyst comprises a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

The organoaluminum co-catalyst is preferably an aluminum alkyl of the formula $AlR^\wedge_3$ where $R^\wedge$ is an alkyl having 1–8 carbon atoms, R' being the same or-different. Examples of aluminum alkyls are trimethyl aluminum (TRA), triethyl aluminum (TEAl) and triisobutyl aluminum (TiBAl). The preferred aluminum alkyl is TEAl.

The term "electron donor" as used herein, refers to the external electron donor or selectivity control agent (SCA). The external electron donor acts as a stereoregulator to control the amount of atactic form of polymer produced. It may also increase the production of isotactic polymers. The electron donor for the present invention is any one of the stereoselectivity control agents which are effective with Ziegler-Natta catalysts. Typically, an electron donor is an organosilicon compound. The electron donors included in the present invention are organic silicon compounds such as those described by the following formula:

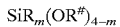

$SiR_m(OR^\#)_{4-m}$ where R is an alkyl group, a cycloalkyl group, an aryl group or a vinyl group, $R^\#$ is an alkyl group, m is 0–4, R may be the same or different, $R^\#$ may be the same or different. Examples of electron donors are cyclohexylmethyldimethozysilane (CMDS), diphenyldimethoxysilane (DPMS) and isobutyl trimethoxysilane (IBMS). Other examples of electron donors are disclosed in U.S. Pat. Nos. 4,218,339; 4,395,360; 4,328,122; 4,473,660; 4,562,173 and 4,547,552, which are hereby incorporated by reference. The preferred electron donor is CMDS.

The metallocene catalyst component may be a cyclopentadienide, i.e., a metal derivative of a cyclopentadiene. The unbridged metallocene should contain at least one cyclopentadiene ring and be of the general formula:

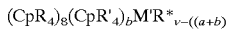

$(CpR_4)_a(CpR'_4)_bM'R^*_{v-((a+b))}$ where Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, a and b are 0 or 1, indicating whether the particular Cp ring is present, but at least one of a or b must be 1; M' is Group IVB metal, $R^*$ is a hydride, a halogen or a hydrocarbyl from 1–20 carbon atoms, v is the valence of M'. Preferably, a is 1 and b is 0 or 1, $(CpR_4)$ and $(CpR'_4)$ are the same and are cyclopentadienyl rings such that they are unsubstituted cyclopentadienyl. Preferably, M' is zirconium or titanium, which have valences of 4. Preferably, R is a halogen or alkyl, most preferably chlorine or methyl.

The alumoxanes useful in combination with the catalyst component of the present invention may be represented by the general formula $(R^:—Al—)_n$ in the cyclic form and $R^:(R^:—Al—O)—_n—AlR^:_2$ in the linear form wherein R is an alkyl group with one to five carbon atoms and n is an integer from 1 to about 20. Most preferably, $R^:$ is a methyl group. The alumoxanes can be prepared by various methods known in the art. Preferably, they are prepared by contacting water with a solution of trialkyl aluminum, such as, trimethyl aluminum, in a suitable solvent such as benzene. Another preferred method includes the preparation of alumoxane in the presence of a hydrated copper sulfate as described in U.S. Pat. No. 4,404,344, the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art. The preferred alumoxane is methyl alumoxane (MAO).

To obtain a catalyst system which will produce a polymer having high molecular weight and fractional melt flow index, the unbridged metallocene compound is preferably cyclopentadienyl titanium trichloride or bis(cyclopentadienyl)titanium dichloride and an alumoxane co-catalyst may or may not be present. If an alumoxane co-catalyst is not present, the unbridged metallocene compound may also include cyclopentadienylzirconium trichloride. To obtain a catalyst system which will produce a polymer having high molecular weight, broad molecular weight distribution and fractional melt flow index, the unbridged metallocene compound is preferably cyclopentadienyltitanium trichloride or bis(cyclopentadienyl)titanium dichloride and an alumoxane co-catalyst is present. Addition of the alumoxane co-catalyst results in the molecular weight decreasing (but not to the level of using no metallocene compound) and the molecular weight distribution broadening. Addition of alumoxane co-catalyst is directly proportional to melt flow index, i.e., increasing the amount of alumoxane increases the melt flow index.

The bridged metallocene should contain two cyclopentadiene rings and be of the general formula:

$$R''(CpR_4)(CpR'_4)M''R^{*'}{}_{v-2}$$

where Cp is a cyclopentadienyl ring, R and R' are substituents on the cyclopentadienyl rings such that $(CpR_4)$ and $(CpR'_4)$ are indenyl; R" is a structural bridge between the two Cp rings imparting stereorigidity to the Cp rings, M" is a Group IVB metal, $R^{*'}$ is a hydride, a halogen or a hydrocarbyl from 1–20 carbon atoms, v is the valence of M". Preferably, R" is selected from the group consisting of an alkyl radical having 1–20 carbon atoms or a hydrocarbyl radical containing silicon, germanium, phosphorus, nitrogen, boron, or aluminum, and, most preferably, selected from the group consisting of an alkylene radical having 1–4 carbon atoms, a cyclic hydrocarbyl radical having 3–12 carbon atoms, an aryl radical, a diaryl methyl radical, a diaryl silyl radical, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical and more preferably is a methyl, ethyl, isopropyl, cyclopropyl, dimethylsilyl, methylene, ethylene or diphenylmethyl or diphenylsilyl radical. Preferably, M" is zirconium or titanium, which have valences of 4, and most preferably, M" is zirconium. Preferably, $R^{*'}$ is a halogen or alkyl, most preferably chlorine or methyl.

To obtain a catalyst system which will produce a polymer having high molecular weight, broad molecular weight distribution, fractional melt flow index and low xylene solubles, the unbridged metallocene compound is preferably bis(cyclopentadienyl)titanium dichloride, the bridged metallocene compound is preferably ethylenebis(indenyl) zirconium dichloride and an alumoxane co-catalyst is present.

By using a catalyst system having at least one unbridged metallocene catalyst and at least one heterogeneous catalyst a high molecular weight polymer can be produced with molecular weight distribution (MWD) as broad or broader than the MWD of the heterogeneous catalyst alone. A polymer having a broad molecular weight distribution and a fractional melt flow index can be produced in a single reactor.

The invention having been generally described, the following examples are given as particular embodiments of the invention and to demonstrate the practice and advantages thereof. It is understood that the examples are given by way of illustration and are not intended to limit the specification or the claims to follow in any manner.

SUMMARY OF POLYMERIZATION CONDITIONS
(ONE UNBRIDGED METALLOCENE)

| | |
|---|---|
| wt. of catalyst: | 10.0 mgrams (0.0052 mmol Ti) |
| wt. of metallocene: | 1.0, 4.0 mgrams |
| amount of TEAl (co-catalyst): | 1.0 mmoles |
| amount of MAO* (co-catalyst): | 4.0, 4.8, 5.6, 6.4 mmoles Al |
| amount of CMDS (donor): | 0.1 mmoles |
| Hydrogen: | 16 mmoles |
| Propylene: | 750 g (1.4 L) |
| Temp.: | 60° C. |
| Time: | 60 mins. |

*MAO is a toluene solution of an alumoxane which is comprised almost entirely of methyl groups by mole per cent.

EXAMPLE 1

A hexane solution of TEAl, a hexane solution of CMDS, a mineral oil suspension of a commercially available conventional supported Ziegler-Natta catalyst for polymerization of olefins and 4 mgs of cyclopentadienyl titanium trichloride, and propylene (in that order) was charged into a stainless steel catalyst transfer cylinder. Propylene was charged to a 2 liter, magnedrive, packless Zipperclave reactor maintained at 60° C. The cylinder was connected to the reactor and after a prepolymerization of 5 sec the contents were flushed into the reactor with 0.4–0.6 l of propylene. The contents of the reactor were stirred at 1200 rpm and polymerization continued for one hour. The temperature of the reactor was lowered to room temperature and the monomer was vented. The polymer was collected and placed in a vacuum oven at 5° C. for a minimum of 3 hours. The polymer yield and analysis is shown in Table I.

EXAMPLE 2

The procedure of Example 1 was followed except bis (cyclopentadienyl) titanium dichloride was used in place of cyclopentadienyl titanium trichloride. The polymer yield and analysis is shown in Table I.

EXAMPLE 3

The procedure of Example 1 was followed except cyclopentadienyl zirconium trichloride was used in place of cyclopentadienyl titanium trichloride. The polymer yield and analysis is shown in Table I.

EXAMPLE 4

The procedure of Example 1 was followed except bis (cyclopentadienyl) zirconium dichloride was used in place of cyclopentadienyl titanium trichloride. The polymer yield and analysis is shown in Table I.

EXAMPLE 5

The procedure of Example 1 was followed except bis (cyclopentadienyl) hafnium dichloride was used in place of cyclopentadienyl titanium trichloride. The polymer yield and analysis is shown in Table I.

EXAMPLE 6

The procedure of Example 1 was followed except no metallocene was used. The polymer yield and analysis is shown in Table I.

EXAMPLE 7

The procedure of Example 1 was followed except a toluene solution of MAO was used in place of a hexane solution of TEAl and 1 mg of metallocene was used instead of 4 mg. The polymer yield and analysis is shown in Table II.

EXAMPLE 8

The procedure of Example 7 was followed except 1 mg of bis(cyclopentadienyl) titanium dichloride was used in place of 4 mgs of cyclopentadienyl titanium trichloride. The polymer yield and analysis is shown in Table II.

EXAMPLE 9

The procedure of Example 7 was followed except cyclopentadienyl zirconium trichloride was used in place of cyclopentadienyl titanium trichloride. The polymer yield and analysis is shown in Table II.

EXAMPLE 10

The procedure of Example 7 was followed except bis(cyclopentadienyl) zirconium dichloride was used in place of cyclopentadienyl titanium trichloride. The polymer yield and analysis is shown in Table II.

EXAMPLE 11

The procedure of Example 7 was followed except bis(cyclopentadienyl) hafnium dichloride was used in place of cyclopentadienyl titanium trichloride. The polymer yield and analysis is shown in Table II.

EXAMPLE 12

The procedure of Example 7 was followed except no metallocene was used and MAO containing 4.6 mmol of aluminum was used. The polymer yield and analysis is shown in Table II.

EXAMPLE 13

The procedure of Example 1 was followed except a toluene solution of MAO was used in addition to the hexane solution of TEAl and bis(cyclopentadienyl) zirconium dichloride was used in place of cyclopentadienyl titanium trichloride. The polymer yield and analysis is shown in Table III.

EXAMPLE 14

The procedure of Example 13 was followed except MAO containing 4.8 mmol of aluminum was used instead of 4.0 mmol. The polymer yield and analysis is shown in Table III.

EXAMPLE 15

The procedure of Example 1 was followed except MAO containing 5.6 mmol of aluminum was used instead of 4.0 mmol of aluminum. The polymer yield and analysis is shown in Table III.

EXAMPLE 16

The procedure of Example 1 was followed except MAO containing 6.4 mmol of aluminum was used instead of 4.0 mmol of aluminum. The polymer yield and analysis is shown in Table III.

EXAMPLE 17

The procedure of Example 1 was followed except a toluene solution of MAO was used in addition to the hexane solution of TEAl and bis(cyclopentadienyl) titanium dichloride was used in place of cyclopentadienyl titanium trichloride. The polymer yield and analysis is shown in Table III.

EXAMPLE 18

The procedure of Example 17 was followed except MAO containing 4.8 mmol of aluminum was used instead of 4.0 mmol of aluminum. The polymer yield and analysis is shown in Table III.

EXAMPLE 19

The procedure of Example 17 was followed except MAO containing 5.6 mmol of MAO was used instead of 4.0 mmol of aluminum. The polymer yield and analysis is shown in Table III.

EXAMPLE 20

The procedure of Example 17 was followed except MAO containing 6.4 mmol of aluminum was used instead of 4.0 mmol of aluminum. The polymer yield and analysis is shown in Table III.

EXAMPLE 21

The procedure of Example 1 was followed except toluene solution of MAO was used in addition to the hexane solution of TEAl. The polymer yield and analysis is shown in Table III.

EXAMPLE 22

The procedure of Example 21 was followed except MAO containing 5.6 mmol of aluminum was used instead of 4.0 =mol of aluminum. The polymer yield and analysis is shown in Table III.

EXAMPLE 23

The procedure of Example 21 was followed except MAO containing 6.4 mmol of aluminum was used instead of 4.0 mmol of aluminum. The polymer yield and analysis is shown in Table III.

EXAMPLE 24

The procedure of Example 21 was followed except no metallocene was used and MAO containing 4.5 mmol of aluminum was used instead of 4.0 mmol of aluminum. The polymer yield and analysis is shown in Table III.

TABLE I

| EXAMPLE | Metallocene Type | Metn wt mg | MAO (Al) ml (mmol) | TEAL mmol | CMDS mmol | Yield g | $M_w (M_n)$ $10^{-3} (10^{-3})$ | $M_w/M_n$ | X'sol | MFI g/10 min | $M_z$ $10^{-6}$ | $M_{z+1}$ $10^{-6}$ |
|---|---|---|---|---|---|---|---|---|---|---|---|---|
| 1 | $CpTiCl_3$ | 4.0 | None | 1.0 | 0.1 | 125 | 496 (56) | 8.8 | 4.0 | 1.0 | 1.5 | 2.5 |
| 2 | $Cp_2TiCl_2$ | 4.0 | None | 1.0 | 0.1 | 70 | 1061 (156) | 6.8 | 8.4 | 0.03 | 2.4 | 3.5 |
| 3 | $CpZrCl_3$ | 4.0 | None | 1.0 | 0.1 | 171 | 557 (63) | 8.9 | 1.8 | 0.6 | 1.6 | 2.7 |
| 4 | $Cp_2ZrCl_2$ | 4.0 | None | 1.0 | 0.1 | 145 | 448 (49) | 9.0 | 5.1 | 1.5 | 1.4 | 2.4 |
| 5 | $Cp_2HfCl_2$ | 4.0 | None | 1.0 | 0.1 | 140 | 435 (54) | 8.1 | 1.6 | 1.7 | 1.3 | 2.2 |
| 6 | None | | None | 1.0 | 0.1 | 108 | 453 (52) | 8.7 | 1.8 | 1.4 | 1.4 | 2.3 |

TABLE II

| EXAMPLE | Metallocene Type | Metn wt mg | MAO (Al) ml (mmol) | TEAL mmol | CMDS mmol | Yield g | $M_w (M_n)$ $10^{-3} (10^{-3})$ | $M_w/M_n$ | X'sol | MFI | $M_z$ | $M_{z+1}$ |
|---|---|---|---|---|---|---|---|---|---|---|---|---|
| 7 | $CpTiCl_3$ | 1.0 | 2.5 (4.0) | None | 0.1 | 70 | 460 (40) | 11.6 | 9.0 | 1.3 | 1.5 | 2.6 |
| 8 | $Cp_2TiCl_2$ | 1.0 | 2.5 (4.0) | None | 0.1 | 108 | 356 (35) | 10.1 | 7.0 | 3.6 | 1.2 | 2.1 |
| 9 | $CpZrCl_3$ | 1.0 | 2.5 (4.0) | None | 0.1 | 85 | 344 (36) | 9.5 | 4.5 | 4.5 | 1.2 | 2.1 |
| 10 | $Cp_2ZrCl_2$ | 1.0 | 2.5 (4.0) | None | 0.1 | 78 | 345 (32) | 10.7 | 11 | 4.8 | 1.3 | 2.3 |
| 11 | $Cp_2HfCl_2$ | 1.0 | 2.5 (4.0) | None | 0.1 | 121 | 336 (38) | 8.9 | 5.0 | 4.0 | 1.2 | 2.1 |
| 12[a] | None | — | 2.9 (4.6) | None | 0.16 | 170 | 348 (37) | 9.4 | 5.8 | 4.0 | 1.2 | 2.1 |

[a]Z/N Catalyst, 15 mg (0.0074 mmol Ti)

TABLE III

| EXAMPLE | Metallocene Type | Metn wt mg | MAO (Al) ml (mmol) | TEAL mmol | CMDS mmol | Yield g | $M_w (M_n)$ $10^{-3} (10^{-3})$ | $M_w/M_n$ | X'sol | MFI g/10 min | $M_z$ $10^{-6}$ | $M_{z+1}$ $10^{-6}$ |
|---|---|---|---|---|---|---|---|---|---|---|---|---|
| 13 | $Cp_2ZrCl_2$ | 4.0 | 2.5 (4.0) | 1.0 | 0.1 | 156 | 443 (42) | 10.7 | 5.9 | 1.5 | 1.5 | 2.5 |
| 14 | same | 4.0 | 3.0 (4.8) | 1.0 | 0.1 | 178 | 366 (29) | 12.8 | 8.0 | 5.0 | 1.3 | 2.4 |
| 15 | same | 4.0 | 3.5 (5.6) | 1.0 | 0.1 | 172 | 355 (27) | 13.0 | 9.3 | 4.5 | 1.3 | 2.3 |
| 16 | same | 4.0 | 4.0 (6.4) | 1.0 | 0.1 | 165 | 344 (26) | 13.5 | 9.5 | 4.8 | 1.3 | 2.3 |
| 17 | $Cp_2TiCl_2$ | 4.0 | 2.5 (4.0) | 1.0 | 0.1 | 98 | 783 (70) | 11.2 | 3.6 | 0.12 | 1.9 | 3.2 |
| 18 | same | 4.0 | 3.0 (4.8) | 1.0 | 0.1 | 111 | 767 (69) | 11.2 | 6.6 | 0.15 | 2.4 | 3.9 |
| 19 | same | 4.0 | 3.5 (5.6) | 1.0 | 0.1 | 111 | 713 (74) | 9.7 | 7.3 | 0.25 | 2.2 | 3.6 |
| 20 | same | 4.0 | 4.0 (6.4) | 1.0 | 0.1 | 94 | 680 (63) | 10.8 | 6.6 | 0.30 | 2.2 | 3.6 |
| 21 | $CpTiCl_3$ | 4.0 | 3.0 (4.8) | 1.0 | 0.1 | 114 | 618 (64) | 9.7 | 6.6 | 0.36 | 2.0 | 3.3 |
| 22 | same | 4.0 | 3.5 (5.6) | 1.0 | 0.1 | 115 | 663 (66) | 10.1 | 8.5 | 0.28 | 2.1 | 3.6 |
| 23 | same | 4.0 | 4.0 (6.4) | 1.0 | 0.1 | 112 | 648 (60) | 10.8 | 7.6 | 0.36 | 2.1 | 3.4 |
| 24 | none | — | 2.8 (4.5) | 1.0 | 0.1 | 190 | 350 (42) | 8.0 | 7.7 | 4.8 | 1.2 | 2.2 |

By using a catalyst system having at least one unbridged metallocene catalyst, at least one bridged metallocene and at least one heterogeneous catalyst a polymer can be produced with molecular weight distribution (MWD) as broad or broader than the MWD of the heterogeneous catalyst alone. A polymer having a broad molecular weight distribution, a fractional melt flow index and low xylene solubles can be produced in a single reactor.

SUMMARY OF POLYMERIZATION CONDITIONS
(ONE UNBRIDGED AND ONE BRIDGED METALLOCENE)

| | |
|---|---|
| wt. of catalyst: | 10.0 mgrams |
| wt. of metallocene[Et(Ind)$_2$ZrCl$_2$]: | .06, .6, .9, 1, 1.8 mgrams |
| wt. of metallocene[(Cp)$_2$TiCl$_2$]: | .05, .06, .1, 1 mgrams |
| molar ratio MMAO*:TEA1: | 2.5:1 |
| TEA1 (in heptane solution): | 0.63, 0.75, 0.88, 1.0 mmol |
| amount of CMDS (electron donor): | .1 mmoles |
| Al/Ti(Ti + Zr): | 200 |
| Al/Si: | 20 |
| Si/Ti(Ti + Zr): | 10 |
| Hydrogen: | 16 mmoles, 48 mmoles |
| Propylene: | 750 g (1.4 L) |
| Temp.: | 60° C. |
| Time: | 60 mins. |

*MMAO (modified MAO) is a heptane solution of an alumoxane which is comprised of a majority of methyl groups by mole per cent and a substantial amount of isobutyl groups by mole per cent.

EXAMPLE 25

The reactor was stabilized at room temperature and then 16 mmoles of hydrogen were added. A heptane solution of TEAl and a hexane solution of CMDS, a mineral oil suspension of a commercially available conventional supported Ziegler-Natta catalysts for polymerization of olefins, ethylene bis(indenyl)zirconium dichloride and bis (cyclopentadienyl)titanium dichloride, and propylene (in that order) was charged into a stainless steel catalyst transfer cylinder. Propylene was charged to a 2 liter, magnedrive, packless Zipperclave reactor maintained at 60° C. The cylinder was connected to the reactor and after a prepolymerization of 5 sec the contents were flushed into the reactor with 0.4–0.6 l of propylene. The contents of the reactor were stirred as 1200 rpm and polymerization continued for one hour. The temperature of the reactor was lowered to room temperature and the monomer was vented. The polymer was collected and placed in a vacuum oven at 50° C. for a minimum of 3 hours. The polymer yield and analysis is shown in Table IV.

EXAMPLE 26

The procedure of Example 25 was followed except the Z-N/Met1/Met2 ratio and the amount of the aluminum in the MMAO/TEAl solution was changed. The polymer yield and analysis is shown in Table IV.

EXAMPLE 27

The procedure of Example 25 was followed except the Z-N/Met1/Met2 ratio and the amount of the aluminum in the MMAO/TEAl solution and the MRAO/TEAl molar ratio was changed. The polymer yield and analysis is shown in Table IV.

EXAMPLE 28

The procedure of Example 25 was repeated except that 48 mmoles of hydrogen was used. The polymer yield and analysis is shown in Table IV.

EXAMPLE 29

The procedure of Example 26 was followed except that 48 mmoles of hydrogen was used. The polymer yield and analysis is shown in Table IV.

EXAMPLE 30

The procedure of Example 25 was followed except no Met2 was present and the ratio of Zn/Met1 and the amount of the aluminum in the MMAO/TEAl solution was changed. The polymer yield and analysis is shown in Table IV.

EXAMPLE 31

The procedure of Example 25 was followed except no Met2 was present and the ratio of Zn/Met1 and the amount of aluminum in the MMAO/TEAl solution was changed. The polymer yield and analysis is shown in Table IV.

EXAMPLE 32

The procedure of Example 25 was followed except no Met2 was present and the ratio of Zn/Met1 and the amount of aluminum in the MMAO/TEAl solution was changed. The polymer yield and analysis is shown in Table IV.

EXAMPLE 33

The procedure of Example 25 was followed except no Met2 was present and the ratio of Zn/Met1 and the amount of aluminum in the MMAO/TEAl solution was changed. The polymer yield and analysis is shown in Table IV.

EXAMPLE 34

The procedure of Example 25 was followed except no Met1 was present and the ratio of Zn/Met2 and the amount of aluminum in the MMAO/TEAl solution was changed. The polymer yield and analysis is shown in Table IV.

EXAMPLE 35

The procedure of Example 25 was followed except no Met1 was present and the ratio of Zn/Met2 and the amount of aluminum in the MMAO/TEAl solution was changed. The polymer yield and analysis is shown in Table IV.

EXAMPLE 36

The procedure of Example 25 was followed except no Met1 was present and the ratio of Zn/Met2 and the amount of aluminum in the MMAO/TEAl solution was changed. The polymer yield and analysis is shown in Table IV.

TABLE IV

| EXAMPLE | Z-N/Met1/Met2 mg/mg/mg | MMAO + TEAL[a] mmol of Al | Yield g | MFI g/10 min | XS % | Mwx $(10^{-3})$ | Mn $(10^{-3})$ | MWD | Mz $(10^{-6})$ | Mz + 1 $(10^{-6})$ |
|---|---|---|---|---|---|---|---|---|---|---|
| A. Ziegler Natta Catalyst + Met1 + Met2 | | | | | | | | | | |
| 25 | 10/1/0.06 | 1.6 | 85 | 0.22 | 5.4 | 625 | 68 | 9.1 | 1.7 | 2.7 |
| 26 | 10/0.06/1 | 1.8 | 82 | 0.03 | 4.9 | 956 | 82 | 12 | 2.6 | 4.0 |
| 27 | 10/0.6/0.05 | 1.3[b] | 114 | 0.04 | 2.1 | 587 | 63 | 9.0 | 1.7 | 2.9 |
| 28 | 10/1/0.06 | 1.6[c] | 96 | 0.71 | 5.3 | 607 | 59 | 10 | 2.0 | 3.3 |
| 29 | 10/0.06/1 | 1.8[c] | 68 | 0.08 | 5.3 | 874 | 67 | 13 | 2.6 | 4.0 |
| B. Ziegler Natta Catalyst + Met1 | | | | | | | | | | |
| 30 | 10/1.8/0.0 | 1.9 | 110 | 4.1 | 6.1 | 346 | 25 | 14 | 1.3 | 2.3 |
| 31 | 10/0.9/0.0 | 1.5 | 124 | 5.0 | 4.1 | 325 | 28 | 12 | 1.2 | 2.1 |
| 32 | 10/0.6/0.0 | 1.3 | 95 | 4.0 | 4.9 | 371 | 35 | 11 | 1.4 | 2.6 |
| 33 | 10/0.9/0.0 | 1.5[b] | 130 | 2.5 | 2.5 | 409 | 31 | 13 | 1.3 | 2.3 |
| C. Ziegler Natta Catalyst + Met2 | | | | | | | | | | |
| 34 | 10/0.0/0.1 | 1.1 | 72 | 0.22 | 5.2 | 820 | 76 | 11 | 2.4 | 4.0 |
| 35 | 10/0.0/0.1 | 1.1[b] | 94 | 0.33 | 3.3 | 747 | 85 | 8.8 | 2.2 | 3.6 |
| 36 | 10/0.0/0.05 | 1.1[b] | 100 | 2.0 | 4.6 | 455 | 44 | 10 | 1.6 | 2.8 |

Z-N - Ziegler-Natta catalyst compound
Met1 - Ethylene bis(indenyl)$_2$zirconium dichloride
Met2 - Bis(cyclopentadienyl)titanium dichloride
XS - Xylene Solubles
MFI - Melt Flow Index
MWD - Molecular Weight Distribution a) MMAO:TEAL=2.5:1(molar ratio based on Al); a heptane solution was used b) Example 27: 0.88 mmol TEAL added as hexane solution to MMAO+TEAL mixture containing 0.45 mmol Al; Example 33: 1.0 mmol TEAL added as hexane solution to MMAO+TEAL mixture containing 0.5 mmol Al; Example 35: 0.75 mmol TEAL added as hexane solution to MMAO+TEAL mixture containing 0.4 mmol Al; Example 36: 0.63 mmol TEAL added as hexane solution to MMAO+TEAL mixture containing 0.37 mmol Al.

c) The amount of hydrogen was increased to 48 mmol.

Notes

1) In all polymerizations, ratios, Al:Si=20; and Al:Ti+Zr (Ti)=200 were used.

2) DSCs of all polymers showed m.pt in the range 160–163° C.

3) MW Data obtained from GPC (Gel Permeation Chromatography) data.

The addition of a metallocene compound to a conventional supported Ziegler-Natta catalyst to form a catalyst system in which both alkyl aluminum and alumoxane are used as co-catalysts has been shown to modify the performance of the catalyst in polymerization of olefins.

Table I shows the effect of the addition of metallocene compound on a conventional supported Ziegler-Natta catalyst with TEAl only as a co-catalyst. Table II shows the effect of the addition of metallocene compound on a conventional supported Ziegler-Natta catalyst with MAO only as a co-catalyst. Table III shows the effect of the addition of metallocene compound on a conventional supported Ziegler-Natta catalyst with MAO and TEAl as co-catalysts.

The data demonstrates that use of biscyclopentadienyl and monocyclopentadienyl complexes of Group IVB metal when used in combination with conventional Ziegler-Natta catalysts and TEAl alone as a co-catalyst component with or without small amounts of methyl alumoxane yield isotactic polypropylene with broad molecular weight distribution, high molecular weight, low xylene solubles and very low melt flows. Titanium complexes are the most active in this regard, followed by zirconium and hafnium complexes. Use of MAO alone as a co-catalyst yielded lower molecular weight, higher xylene solubles, broader molecular weight distribution and higher melt flow. The properties were similar to those for a Ziegler-Natta catalyst alone under the same conditions except for the higher xylene solubles and broader molecular weight distribution, especially in the case of the titanium complex. Use of mixtures of MAO and TEAl generally gave polymers with properties of intermediate magnitude between the above cases (TEAl alone and MAO alone). It is apparent from the data that, in general, as the ratio of MAO to TEAl was increased, the xylene solubles increased, the molecular weight decreased and the molecular weight distribution increased. But as the ration of MAO to TEAl decreases, the molecular weight increases and xylene solubles decrease as desired but the molecular weight distribution decreases which is a less desirable feature. Using the co-catalyst mixture and titanium complexes, polymers with higher molecular weight, fractional melt flow rates and broad molecular weight distribution were produced.

The combination of two metallocene catalysts with a conventional supported Ziegler-Natta catalyst to form a catalyst system in which both alkyl aluminum and alumoxane are used as co-catalysts was shown to modify the performance of the catalyst in polymerization of olefins. By using at least two metallocene catalysts with a conventional supported Ziegler-Natta catalyst, polymers with high molecular weight, broad molecular weight distribution, fractional melt flow index and low xylene solubles were obtained. These polymers were obtained with a decreased usage of MAO.

Table IV shows the effect of the use of at least two metallocene catalysts with a conventional supported Ziegler-Natta catalyst. The data demonstrates that use of biscyclopentadienyl complexes of Group IVB metal when used in combination with conventional Ziegler-Natta catalysts with TEAl and MMAO as a co-catalysts yield isotactic polypropylene with broad molecular weight distribution, high molecular weight, very low melt flows and low xylene solubles. The amount of MMAO used was significantly decreased over the amount of MAO used in Table III. Use of small amounts of the second metallocene enabled a reduction in the amount of alumoxane needed to obtain broader molecular weight distribution and a decrease in the xylene solubles and yet the resulting polymer retained high molecular weight and fractional melt flows. The broader molecular weight distribution may be in part attributable to the use of MMAO instead of MAO.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States is:

1. A process for the polymerization of propylene comprising:

a) selecting a conventional Ziegler-Natta transition metal compound catalyst component;

b) contacting the catalyst component with a metallocene compound of

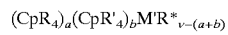

$(CpR_4)_a(CpR'_4)_bM'R^*_{v-(a+b)}$ where Cp is a cyloppentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, a and b are 0 or 1, indicating whether the particular Cp ring is present, but at least one of a or b must be 1; M' is titanium or zirconium and if M' is zirconium a is 1 and b is 0, R* is a hydride, a halogen or a hydrocarbyl from 1–20 carbon atoms, v is the valence of M';

c) contacting an electron donor containing silicon with an organoaluminum co-catalyst compound; wherein said electron donor having the general formula $SiR_m(OR')_{4-m}$ where R is selected from the group consisting of an alkyl group, a cycloalkyl group, an aryl group and a vinyl group; R' is an alkyl group; and m is 0—3, wherein when R is an alkyl group, R may be identical with R'; when m is 0, 1 or 2, the R' groups may be identical or different; and when m is 1, 2 or 3, the R groups may be identical or different and wherein said organoaluminum co-catalyst is described by the formula $AlR^*_3$ where R* is alkyl of from 1–8 carbon atoms R* may be the same or different;

d) adding the catalyst component/metallocene to the electron donor/co-catalyst mixture to form a catalyst;

e) introducing the catalyst into a polymerization reaction zone containing propylene under polymerization reaction conditions; and (f) extracting polypropylene from the reactor having a molecular weight of in the range from 300,000 to 800,000 and a melt flow index of less than or equal to 1.

2. A process for the polymerization of propylene as recited in claim 1 wherein the transition metal compound is of the general formula $MR^+_x$ where M is the metal, $R^+$ is a halogen or a hydrocarboxyl and x is the valence of the metal.

3. A process for the polymerization of propylene as recited in claim 2 wherein M is a Group IVB metal and $R^+$ is chlorine, bromine, an alkoxy or a phenoxy.

4. A process for the polymerization of propylene as recited in claim 3 wherein M is titanium and $R^+$ is chlorine or ethoxy.

5. A process for the polymerization of propylene as recited in claim 1 wherein the transition metal compound is $TiCl_4$, $TiBr_4$, $Ti(OC_2H_5)_3Cl$, $Ti(OC_2H_5)_3Cl$, $Ti(OC_3H_7)_2Cl_2$, $Ti(OC_6H_{13})_2Cl_2$, $Ti(OC_2H_5)_2Br_2$ or $Ti(OC_{12}H_{25})Cl_3$.

6. A process for the polymerization of propylene as recited in claim 1 wherein $(CpR_4)$ and $(CpR'_4)$ are the same and are unsubstituted cyclopentadienyl.

7. A process for the polymerization of propylene as recited in claim 6 wherein $R^*$ is chlorine or methyl.

8. A process for the polymerization of propylene as recited in claim 1 wherein the metallocene compound is cyclopentadienyl titanium trichloride, bis(cyclopentadienyl)titanium dichloride or cyclopentadienylzirconium trichloride.

9. A process for the polymerization of propylene as recited in claim 1 wherein the organoaluminum co-catalyst is an aluminum alkyl of the formula $AlR^{\wedge}_3$ where $R^{\wedge}$ is an alkyl having 1–8 carbon atoms, $R^{\wedge}$ being the same or different.

10. A process for the polymerization of propylene as recited in claim 9 wherein the co-catalyst is trimethyl aluminum, triethyl aluminum or triisobutyl aluminum.

11. A process for the polymerization of propylene as recited in claim 10 wherein the co-catalyst is triethyl aluminum.

12. A process for the polymerization of propylene as recited in claim 1 wherein the electron donor is cyclohexylmethyldimethoxysilane, diphenyldimethoxysilane or isobutyl trimethoxysilane.

13. A process for the polymerization of propylene as recited in claim 1 wherein the electron donor is cyclohexylmethyldimethoxysilane.

14. A process for the polymerization of propylene using the catalyst system comprising:
 a) selecting a conventional Ziegler-Natta transition metal compound catalyst component;
 b) contacting the catalyst with a metallocene compound of

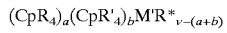

where Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, a and b are 0 or 1, indicating whether the particular Cp ring is present, but at least one of a or b must be 1; M' is titanium, $R^*$ is a hydride, a halogen or a hydrocarbyl from 1–20 carbon atoms, v is the valence of M';
 c) contacting an electron donor containing silicon with an organoaluminum co-catalyst compound; wherein said electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different and wherein said organoaluminum co-catalyst is described by the formula $AlR^*_3$ where $R^*$ is an alkyl of from 1–8 carbon atoms and $R^*$ may be the same or different;
 d) adding an alumoxane of the general formula $(R^{\#}—Al—O)_n$ in the cyclic form and $R^{\#}(R^{\#}—Al—O)_n—AlR^{\#}_2$ in the linear form wherein $R^{\#}$ is an alkyl group with one to five carbon atoms and n is an integer from 1 to about 20;
 e) adding the catalyst to the electron donor/co-catalyst mixture to form a catalyst system;
 f) introducing the catalyst system into a polymerization reaction zone containing propylene under polymerization reaction conditions; and
 g) extracting polypropylene from the reactor having a molecular weight in the range from 300,000 to 800,000, a molecular weight distribution in the range from 7.0 to 14.0 and a melt flow index of less than 1.

15. A process for the polymerization of propylene as recited in claim 14 wherein the transition metal compound is preferably of the general formula $MR^+_x$ where M is the metal, $R^+$ is a halogen or a hydrocarboxyl and x is the valence of the metal.

16. A process for the polymerization of propylene as recited in claim 15 wherein M is a Group IVB metal and $R^+$ is chlorine, bromine, and alkoxy or a phenoxy.

17. A process for the polymerization of propylene as recited in claim 16 wherein M is titanium and $R^+$ is chlorine or ethoxy.

18. A process for the polymerization of propylene as recited in claim 14 wherein the transition metal compound is $TiCl_4$, $TiBr_4$, $Ti(OC_2H_5)_3Cl$, $Ti(OC_2H_5)_3Cl$, $Ti(OC_3H_7)_2Cl_2$, $Ti(OC_6H_{13})_2Cl_2$, $Ti(OC_2H_5)_2Br_2$ or $Ti(OC_{12}H_{25})Cl_3$.

19. A process for the polymerization of propylene as recited in claim 14 wherein $(CpR_4)$ and $(CpR'_4)$ are the same and are unsubstituted cyclopentadienyl.

20. A process for the polymerization of propylene as recited in claim 14 wherein $R^*$ is chlorine or methyl.

21. A process for the polymerization of propylene as recited in claim 14 wherein the organoaluminum co-catalyst is an aluminum alkyl of the formula $AlR^{\wedge}_3$ where $R^{\wedge}$ is an alkyl having 1–8 carbon atoms, $R^{\wedge}$ being the same or different.

22. A process for the polymerization of propylene as recited in claim 21 wherein the co-catalyst is trimethyl aluminum, triethyl aluminum or triisobutyl aluminum.

23. A process for the polymerization of propylene as recited in claim 22 wherein the co-catalyst is triethyl aluminum.

24. A process for the polymerization of propylene as recited in claim 14 wherein the electron donor is cyclohexylmethyldimethoxysilane, diphenyldimethoxysilane and isobutyl trimethoxysilane.

25. A process for the polymerization of propylene as recited in claim 24 wherein the electron donor is cyclohexylmethyl dimethoxysilane.

26. A process for the polymerization of propylene as recited in claim 14 wherein the alumoxane is methylalumoxane.

27. A process for the polymerization of propylene using the catalyst system comprising:
 a) selecting a conventional supported Ziegler-Natta transition metal compound catalyst component;
 b) contacting the catalyst component with at least one bridged metallocene compound of the formula:

where Cp is a cyclopentadienyl ring, R and R' are substituents on the cyclopentadienyl rings such that $(CpR_4)$ and (CpR'₄) are both indenyl; R" is a structural bridge between the two Cp rings imparting stereorigidity to the Cp rings; M" is titanium, R*' is a hydride, a halogen or a hydrocarbyl from 1–20 carbon atoms, v is the valence of M";

and with at least one unbridged metallocene compound of the general formula:

$$(CpR_4)_a(CpR'_4)_bM'R^*_{v-(a+b)}$$

where Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, a and b are 0 or 1, indicating whether the particular Cp ring is present, but at least one of a or b must be 1; M' is titanium or zirconium, R* is a hydride, a halogen or a hydrocarbyl from 1–20 carbon atoms, v is the valence of M';

c) contacting an electron donor containing silicon with an organoaluminum co-catalyst compound; wherein said electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different and wherein said organoaluminum co-catalyst is described by the formula $AlR^*_3$ where R* is an alkyl of from 1–8 carbon atoms and R* may be the same or different;

d) adding an alumoxane of the general formula $(R^\#—Al—O—)_n$ in the cyclic form and $R^\#(R^\#—Al—O)_n—AlR^\#_2$ in the linear form wherein $R^\#$ is an alkyl group with one to five carbon atoms and n is an integer from 1 to about 20;

e) adding the catalyst to the electron donor/co-catalyst mixture to form a catalyst system;

f) introducing the catalyst system into a polymerization reaction zone containing propylene under polymerization reaction conditions; and g) extracting polypropylene from the reactor having a molecular weight in the range from 300,000 to 800,000, a molecular weight distribution in the range from 7.0 to 14.0, a melt flow index less than 1 and xylene solubles less than 6%.

28. A process for the polymerization of propylene as recited in claim 27 wherein the transition metal compound is preferably of the general formula $M^+_x$ where M is the metal, $R^+$ is a halogen or a hydrocarboxyl and x is the valence of the metal.

29. A process for the polymerization of propylene as recited in claim 28 wherein M is a Group IVB metal and $R^+$ is chlorine, bromine, an alkoxy or a phenoxy.

30. A process for the polymerization of propylene as recited in claim 29 wherein M is titanium and $R^+$ is chlorine or ethoxy.

31. A process for the polymerization of propylene as recited in claim 27 wherein the transition metal compound is $TiCl_4$, $TiBr_4$, $Ti(OC_2H_5)_3Cl$, $Ti(OC_2H_5)_3Cl$, $Ti(OC_3H_7)_2Cl_2$, $TiO(C_6H_{13})_2Cl_2$, $Ti(OC_2H_5)_2Br_2$ or $Ti(OC_{12}H_{25})Cl_3$.

32. A process for the polymerization of propylene as recited in claim 27 wherein R" is selected from the group consisting of an alkyl radical having 1–20 carbon atoms or a hydrocarbyl radical containing silicon, germanium, phosphorus, nitrogen, boron, or aluminum.

33. A process for the polymerization of propylene as recited in claim 32 wherein R" is selected from the group consisting of an alkylene radical having 1–4 carbon atoms, a cyclic hydrocarbyl radical having 3–12 carbon atoms, an aryl radical, a diaryl methyl radical, a diaryl silyl radical, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical.

34. A process for the polymerization of propylene as recited in claim 33 wherein R" is selected from the group consisting of a methyl, ethyl, isopropyl, cyclopropyl, dimethylsilyl, methylene, ethylene or diphenylmethyl or diphenylsilyl radical.

35. A process for the polymerization of propylene as recited in claim 34 wherein R" is selected from the group consisting of chlorine or methyl.

36. A process for the polymerization of propylene as recited in claim 27 wherein $R^{*'}$ is a halogen or alkyl.

37. A process for the polymerization of propylene as recited in claim 27 wherein the bridged metallocene compound is ethylene bis(indenyl)zirconium dichloride.

38. A process for the polymerization of propylene as recited in claim 27 wherein $(CpR_4)$ and $(CpR'_4)$ are the same and are unsubstituted cyclopentadienyl.

39. A process for the polymerization of propylene as recited in claim 27 wherein $R^{*'}$ is chlorine or methyl.

40. A process for the polymerization of propylene as recited in claim 27 wherein the unbridged metallocene compound is cyclopentadienyl titanium trichloride or bis(cyclopentadienyl)titanium dichloride.

41. A process for the polymerization of propylene as recited in claim 27 wherein the organoaluminum co-catalyst is an aluminum alkyl of the formula $AlR\hat{}_3$ where $R\hat{}$ is an alkyl having 1–8 carbon atoms, $R\hat{}$ being the same or different.

42. A process for the polymerization of propylene as recited in claim 41 wherein the co-catalyst is trimethyl aluminum, triethyl aluminum or triisobutyl aluminum.

43. A process for the polymerization of propylene as recited in claim 42 wherein the co-catalyst is triethyl aluminum.

44. A process for the polymerization of propylene as recited in claim 27 wherein the electron donor is cyclohexylmethyldimethoxysilane, diphenyldimethoxysilane and isobutyl trimethoxysilane.

45. A process for the polymerization of propylene as recited in claim 43 wherein the electron donor is cyclohexylmethyl dimethoxysilane.

46. A process for the polymerization of propylene as recited in claim 27 wherein the alumoxane is methylalumoxane.

* * * * *